(12) United States Patent
Karpik

(10) Patent No.: US 6,715,575 B2
(45) Date of Patent: Apr. 6, 2004

(54) TRACK TENSIONING SYSTEM FOR A TRACKED VEHICLE

(75) Inventor: Gerard J. Karpik, Eveleth, MN (US)

(73) Assignee: Formula Fast Racing, Eveleth, MN (US)

( * ) Notice: Subject to any disclaimer, the term of this patent is extended or adjusted under 35 U.S.C. 154(b) by 0 days.

(21) Appl. No.: 10/214,004

(22) Filed: Aug. 7, 2002

(65) Prior Publication Data

US 2003/0034191 A1 Feb. 20, 2003

Related U.S. Application Data

(60) Provisional application No. 60/312,713, filed on Aug. 16, 2001, and provisional application No. 60/314,519, filed on Aug. 22, 2001.

(51) Int. Cl.⁷ ............................................... B62M 27/02
(52) U.S. Cl. .................... 180/193; 180/190; 180/9.5; 305/143
(58) Field of Search ................................. 180/193, 190, 180/9.5, 9.56; 305/127, 143, 151, 153

(56) References Cited

U.S. PATENT DOCUMENTS

| 3,089,710 A | 5/1963 | Fiala |
| 3,115,945 A | 12/1963 | Dry et al. |
| 3,527,505 A | 9/1970 | Hetteen |

(List continued on next page.)

FOREIGN PATENT DOCUMENTS

| CA | 895747 | 3/1972 |
| CA | 942802 | 2/1974 |
| CA | 944001 | 3/1974 |
| CA | 956674 | 10/1974 |
| CA | 994395 | 8/1976 |
| CA | 1026807 | 2/1978 |
| CA | 1029425 | 4/1978 |
| FI | 850110 | 7/1986 |
| FI | 901451 | 9/1991 |
| FR | 1035475 | 4/1953 |

OTHER PUBLICATIONS

Boyum, Pivoting Track Tensioning System for a Tracked Vehicle, Nov. 21, 2002, US Patent Application Publication 2002/0171290 A1.*

Primary Examiner—Lesley D. Morris
Assistant Examiner—Tony Winner
(74) Attorney, Agent, or Firm—Faegre & Benson LLP

(57) ABSTRACT

A suspension system for suspending an endless track beneath a tracked vehicle chassis. The suspension system can be a fully coupled suspension, a partially coupled suspension or a non-coupled suspension. The suspension system includes at least one elongated suspension rail having a front portion, a rear portion and a bottom track-engaging portion. At least one suspension arm has an upper end adapted for pivotal connection to the vehicle chassis and a lower end pivotally connected to the suspension rail. The lower end of the suspension arm can optionally have a displacement with a non-linear component. A biasing mechanism provides a biasing force to bias the suspension rail away from the vehicle chassis. The track tensioning system coupled to the suspension arm applies a tensioning force to the endless track in response to displacement of the suspension arm. The tensioning force generates a supplemental force transmitted by the endless track that augments the biasing force of the biasing mechanism. In a suspension system with front and rear suspension arms, the track tensioning system can be coupled to the front or rear suspension arms.

30 Claims, 12 Drawing Sheets

U.S. PATENT DOCUMENTS

| | | |
|---|---|---|
| 3,623,563 A | 11/1971 | Gostomski |
| 3,637,265 A | 1/1972 | Valentine et al. |
| 3,658,392 A | 4/1972 | Perreault et al. |
| 3,711,164 A | 1/1973 | Chaumont |
| 3,721,308 A | 3/1973 | Brandei et al. |
| 3,727,709 A | 4/1973 | Newman |
| 3,744,583 A | 7/1973 | Bedard |
| 3,788,412 A | 1/1974 | Vincent |
| 3,879,092 A | 4/1975 | Rose |
| 3,913,693 A | 10/1975 | Hale et al. |
| 3,913,694 A | 10/1975 | Forsgren |
| 3,933,213 A | 1/1976 | Trowbridge |
| 3,944,005 A | 3/1976 | Tomita |
| 3,966,181 A | 6/1976 | Lessard |
| 4,057,916 A | 11/1977 | Roemer |
| 4,222,453 A | 9/1980 | Fixsen et al. |
| 4,337,958 A | 7/1982 | Witt et al. |
| 4,407,386 A | 10/1983 | Yasui et al. |
| 4,489,954 A | 12/1984 | Yasui et al. |
| 4,518,056 A | 5/1985 | Kobayashi |
| 4,671,521 A | 6/1987 | Talbot et al. |
| 4,690,234 A | 9/1987 | Takada |
| 4,699,229 A * | 10/1987 | Hirose et al. .............. 180/9.21 |
| 4,700,815 A | 10/1987 | Persicke et al. |
| 4,987,965 A | 1/1991 | Bourret |
| 5,014,805 A | 5/1991 | Uchida |
| 5,029,664 A | 7/1991 | Zulawski |
| 5,203,424 A | 4/1993 | Gogo et al. |
| 5,265,692 A | 11/1993 | Mallette |
| 5,370,198 A | 12/1994 | Karpik |
| 5,533,585 A | 7/1996 | Kawano et al. |
| 5,667,031 A | 9/1997 | Karpik |
| 5,692,579 A | 12/1997 | Peppel et al. |
| 5,727,643 A | 3/1998 | Kawano et al. |
| 5,829,545 A | 11/1998 | Yamamoto et al. |
| 5,881,834 A | 3/1999 | Karpik |
| 5,904,217 A | 5/1999 | Yamamoto et al. |
| 5,944,134 A | 8/1999 | Peppel et al. |
| 5,947,220 A | 9/1999 | Oka et al. |
| 6,032,752 A | 3/2000 | Karpik et al. |
| 6,142,494 A | 11/2000 | Higuchi |
| 6,170,589 B1 | 1/2001 | Kawano et al. |
| 6,206,124 B1 | 3/2001 | Mallette et al. |
| 6,315,374 B1 * | 11/2001 | Johansson ................... 305/145 |

* cited by examiner

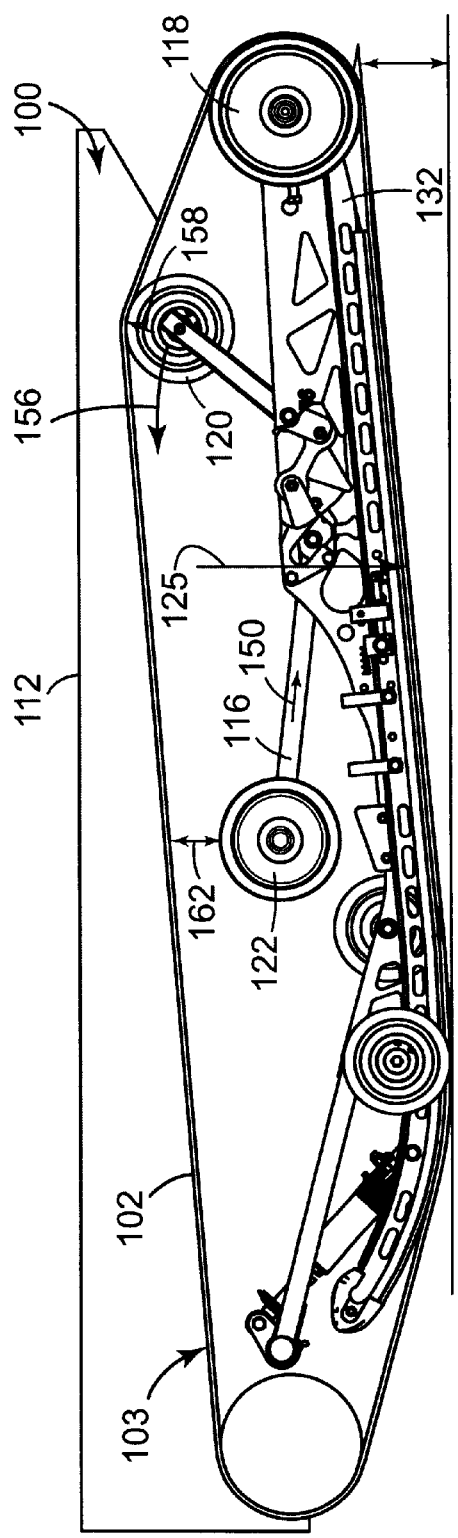
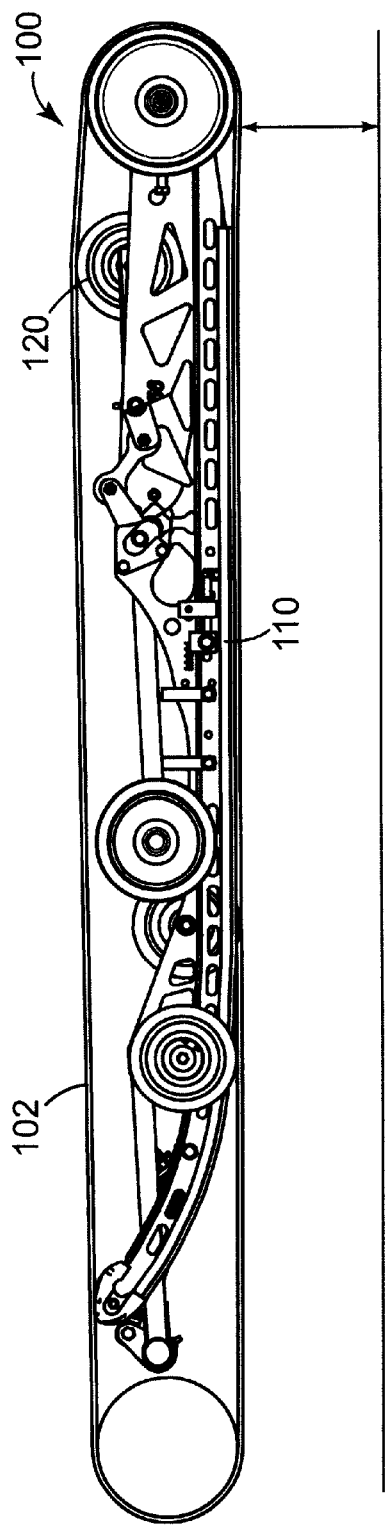
Fig. 8
Fig. 9

TRACK TENSIONING SYSTEM FOR A TRACKED VEHICLE

CROSS REFERENCE TO RELATED APPLICATIONS

The present invention claims the benefit of U.S. patent application Ser. No. 60/312,713 entitled "Track Tensioning System For A Tracked Vehicle", filed Aug. 16, 2001 and U.S. patent application Ser. No. 60/314,519, entitled "Track Tensioning System For A Tracked Vehicle", filed Aug. 22, 2002.

FIELD OF THE INVENTION

The present invention relates to a track tensioning system for tracked vehicles, and more particularly, to a system that uses the endless track as a spring to resist suspension displacement caused by certain types of displacement forces.

BACKGROUND OF THE INVENTION

Tracked vehicles, such as snowmobiles, have rear suspension systems generally including front and rear suspension arms pivotally mounted on a shaft rotatably connected to the frame of the tracked vehicle and a slide frame comprising a pair of laterally spaced suspension rails or longitudinal skids interconnected transversely on opposite sides of the machine. The suspension rails are in sliding contact with an endless belt that provides ice and snow surface contact and friction drive for the tracked vehicle. Where the movement of the suspension arms relative to the suspension rail is substantially limited to rotational motion, the suspension system referred to as fully coupled. As used herein, "fully coupled" means a suspension system where a displacement of any portion of the suspension rail causes immediate movement of the entire suspension rail, such as for example where the suspension forms parallelogram configuration.

In many current arrangements, a shackle or sliding block mechanism interconnects the rear suspension arm and the suspension rails to permit relative movement that includes a non-rotational component, such as a lateral or a longitudinal linear component (also referred to as lost motion). Such suspension systems are referred to as non-coupled. As used herein, "non-coupled" refers to a suspension system in which displacement of the rear suspension arm relative to a suspension rail includes a linear component.

The non-coupled configuration allows the front and rear suspension arms to operate independent of one another, which was thought advantageous in the prior art because of favorable weight transfer characteristics that enhance traction. This independence, however, was found to result in rough and unsteady rides for the rider, particularly when the rear suspension of the track encounters an elevated mound of ice or snow or the upward side of a depression. This instability detracts from the enjoyment and the utility of the vehicle since there are many areas which, when traversed, will unduly subject the rider to severe jolts and stress.

The independent movement of the front and rear suspension arms adversely affects the tracked vehicle in several ways. First, track tension is not adequately maintained when there is extreme deflection of either one of the front or rear suspension arms. Extreme variations in track tension can reduce the comfort, control, track life and ultimately the safety of the rider.

Second, independent movement of the front and rear suspension arms in a non-coupled system requires the associated springs and shock absorbers to be sprung and dampened more stiffly because each must individually support the high loads when impact occurs at either the front or rear extreme of the suspension rails. That is, the springs and shock absorbers of each suspension arm must be stiff enough to withstand and control the full impact of the bump and weight of the tracked vehicle by itself. The required stiffness of the spring and shock absorber results in a less comfortable on normal terrain.

Third, when the front suspension arm of a non-coupled suspension deflects as it contacts a bump, the front suspension arm deflects more than the rear suspension arm. This results in an angle of incidence between the suspension rails and the bump. Unless the impact is then large enough to compress the rear suspension arm spring and shock absorber assembly, thereby flattening the angle of incidence, the suspension rails will act as a ramp forcing the rear of the tracked vehicle upward. At low to moderate speeds, the suspension rails angle in an upward incline due to the greater deflection of the front suspension arm than the rear suspension arm, causing the tracked vehicle to hop over the bump, imparting a secondary jolt that increases in intensity with the speed of the tracked vehicle.

These problems were successfully addressed in by the partially coupled suspension systems disclosed in U.S. Pat. No. 5,370,198 (Karpik); U.S. Pat. No. 5,667,031 (Karpik) and U.S. Pat. No. 5,881,834 (Karpik)(hereinafter "the Karpik Patents"). The Karpik Patents disclose a coupling system that permits some independent movement of the rear suspension arm relative to the front suspension arm. Once the rear suspension arm reaches the limit of its independent motion, the system becomes fully coupled.

The coupling system can also serve as a weight transfer mechanism that transmits an increasing percentage of the tracked vehicle's weight to the front suspension arm and the forward end of the slide rail. Through the coupling system, the work of the spring and shock absorbers is shared by the front and rear suspension arms. By sharing forces acting on the suspension system generally between the front and rear suspensions arms, it is possible to use softer shock and spring calibrations than normally would be required to prevent the suspension system from bottoming out. The resulting softer shock and spring calibrations provide a more comfortable ride in normal terrain.

Assuming that the coupling system distributes forces acting on the suspension system between the front and rear suspension arms, the springs and shock absorber at the front suspension arm carries a portion of the force and the rear suspension arm carries the remainder of the force. The minimum theoretical shock and spring calibration must be set to handle the maximum anticipated force the suspension system will encounter. In order to maximize ride comfort on normal terrain, what is needed is a suspension system that reduces the shock and spring calibrations below this theoretical minimum, while still providing adequate resistance to extreme suspension displacement.

BRIEF DESCRIPTION OF THE INVENTION

The present invention relates to a system for using the endless track on a tracked vehicle as a spring to supplement the biasing force of the suspension system during certain types of loads. The resulting increase in track tension resists further increases in perimeter length, hence resisting further suspension displacement. Consequently, the spring and shock absorber calibrations can be reduced to levels not previously possible.

The suspension system for suspending an endless track beneath a tracked vehicle chassis can be a fully coupled suspension, a partially coupled suspension or a non-coupled suspension. The suspension system includes at least one elongated suspension rail having a front portion, a rear portion and a bottom track-engaging portion. At least one suspension arm has an upper end adapted for pivotal connection to the vehicle chassis and a lower end pivotally connected to the suspension rail. The upper or lower ends of the suspension arm can optionally have a displacement with a non-linear component. A biasing mechanism provides a biasing force to bias the suspension rail away from the vehicle chassis. The track tensioning system coupled to the suspension arm applies a tensioning force to the endless track in response to linear and/or rotational displacement of the suspension arm. The tensioning force generates a supplemental force transmitted by the endless track that augments the biasing force of the biasing mechanism. In a suspension system with front and rear suspension arms, the track tensioning system can be coupled to the front or rear suspension arms.

A variety of other mechanism and/or conditions can be used to cause the track tensioning system to increase track tension. In one embodiment, the track tensioning system is coupled to a coupling system. The track tensioning system applies a tensioning force to the endless track when the coupling system is activated. In another embodiment, the track tensioning system applies a tensioning force to the endless track in response to a displacement of the rear portion of the suspension rail greater than a displacement of a front portion of the suspension rail. The track tensioning system can also be triggered when the suspension rail experiences a G-bump or a tail bump. In yet another embodiment, the track tensioning system increases perimeter length of the suspension system in response to displacement of the suspension arm. The increase in perimeter length generates a supplemental force transmitted by the endless track that augments the biasing force of the biasing mechanism.

The displacement of the suspension arm can include linear and/or rotational components that causes the tensioning system to increase track tension. The supplemental force generated by the tensioning system can be proportional or non-proportional to the magnitude of the displacement of the suspension arm.

Various track tensioning mechanisms can be used in connection with the present suspension system. In one embodiment, the track tensioning system comprises a tensioning wheel engaged with an inside surface of the endless track. A bracket pivotally coupled to the suspension system supports the tensioning wheel at a first end and is coupled to one of the suspension arms at a second end.

In another embodiment, the track tensioning system includes a rear wheel pivotally mounted to the rear portion of the suspension rail and a connector arm coupled to the rear suspension arm at a first end and to the rear wheel at a second end. The connector arm can be coupled to the axle of the rear wheel, the bracket supporting the rear wheel or a variety of other locations.

In yet another embodiment, the rear wheel at the rear of the suspension rail is on an axle. The axle slidingly engaged with a slot on the rear portion of the suspension rail. The connector arm couples the rear suspension arm the axle. The slot can be horizontal, a combination of horizontal and non-horizontal components, curvilinear, or a combination thereof. The shape of the slot can vary the incremental increase in track tension as a function of rear wheel displacement.

In another embodiment, the rear wheel slidingly engages with a sliding member on the rear portion of the suspension rail. A connector arm is coupled to the suspension arm at a first end and the sliding member at a second end. The sliding member can include a static track tensioning assembly. The connector arm can include an elastic portion.

In another embodiment, a pivot connects the front portion of the suspension rail to the rear portion. A connector arm is coupled to the suspension arm at a first end and the front portion of the suspension rail at a second end. In one embodiment, the connector arm is coupled to a front suspension arm.

The track tensioning system can be coupled to the suspension arm using an elastic member. The elastic member can be an elastomeric material, a spring, a shock absorber or a variety of other structures. In one embodiment, the supplemental force comprises a compressive force that resists an increase in perimeter length of the suspension system during suspension displacement. In another embodiment, the tensioning system decreases the tensioning force on the track in response to a decrease in perimeter length during suspension displacement.

The suspension system can optionally include a coupling system that couples the rear suspension arm to the suspension rail. The suspension system can be a fully coupled, a partially coupled or a non-coupled suspension system.

BRIEF DESCRIPTION OF THE SEVERAL VIEWS OF THE DRAWING

Other advantages of the present invention will be readily appreciated, as the same becomes better understood by reference to the following detailed description when considered in connection with the accompanying drawings wherein:

FIG. 8 is side view of the suspension system of FIG. 6 with a greater displacement force applied near the rear portion.

FIG. 9 is side view of the suspension system of FIG. 5 in a horizontally compressed configuration.

DETAILED DESCRIPTION OF THE INVENTION

Figure 1:
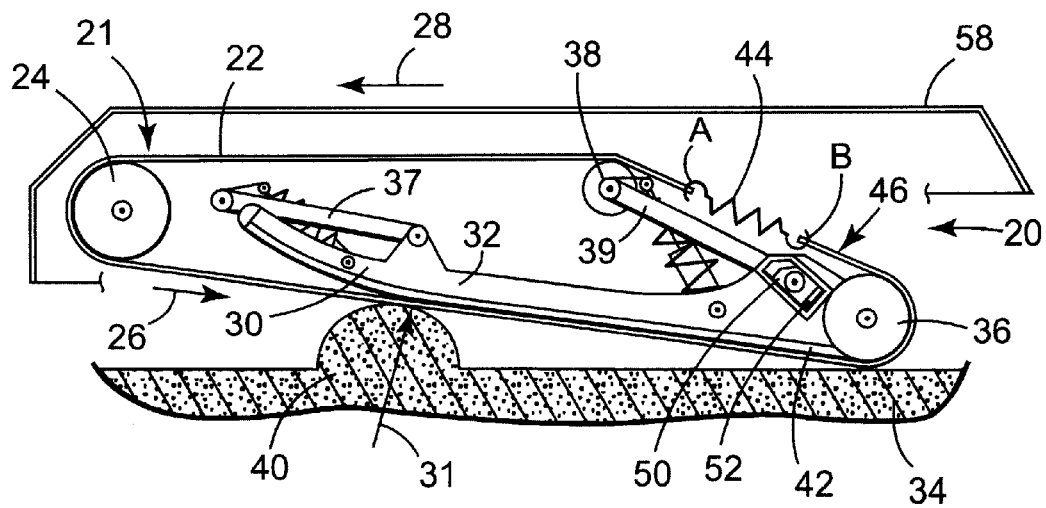
FIG. 1 is a side view of a displacement force applied near the front portion of a suspension system.

In prior suspension systems, whether fully coupled, partially coupled, or non-coupled, reducing the variation in track tension during suspension travel was considered a fundamental objective of the design and considered necessary for good comfort and control of the suspension system. Changes in track tension can be caused by the irregular motions and configurations of the suspension system as it is displaced by bumps and acceleration forces. When the track stretches or loosens during suspension displacement (i.e., displacement of the suspension rails) a significant additional biasing force is added to or subtracted from the total biasing force of the suspension system.

While extreme tension on the track is undesirable, the present invention recognizes that lower levels of track tension can be induced to supplement the biasing force of the suspension system during certain types of suspension displacements. Consequently, the spring and shock absorber calibrations can be reduced to levels not previously possible. Conversely, the present tensioning system can be used to reduce track tension in those situations when excessive tensioning may occur.

In order to better understand the present system for using track tension to supplement the biasing force of a suspension system, a description of the various types of displacement forces applied to various types of suspension systems is required. The exemplary suspension systems of FIGS. 1–4 are used to illustrate suspension displacement. As used herein, "suspension displacement" refers to a change in a gap between the suspension rail(s) and the chassis of the vehicle. Other types of suspensions may behave differently under similar displacement conditions.

FIGS. 1 through 4 are schematic illustrations of various suspension systems 20 for an endless track in a forward mounted drive system. For the sake of simplicity, the same numbering scheme is used in FIGS. 1–4.

The endless track 22 travels around the circumference of the drive sprocket 24 in a direction 26 opposite the direction 28 of vehicle travel. The endless track 22 then travels at a rearward and downward angle away from the drive sprocket 24. The track 22 then generally comes in contact with the front portion 30 of suspension rail 32 (or a wheel mounted to the front portion of the suspension rail). The track 22 continues rearward until it comes in contact with the ground 34 and subsequently rear wheel 36. The rear wheel 36 changes the direction of the track 22 to an upward and forward direction. The track 22 then comes in contact with a carrier guide mechanism 38, usually a wheel that carries the track 22 above the rest of the suspension system 20 on route back to the drive sprocket 24.

FIG. 1 illustrates a non-coupled system. When the front portion 30 of the suspension rail 32 is subject to a displacement force 31, it is displaced independently of rear portion 42. When the rear suspension arm 39 is displaced, it rotates relative to the suspension rail 32. The displacement of the rear suspension arm 39 typically has a non-rotational or linear component. As used herein, the term "linear component" refers to displacement that is at least in part linear, but does not preclude rotational components. In an alternate embodiment, displacement of the front suspension arm 37 may also have a linear component.

In the illustrated embodiment, the displacement force is caused by a collision with bump 40 during displacement of the tracked vehicle in the direction 28. As used herein, "displacement force" refers to a force that causes displacement of a suspension rail relative to a vehicle chassis.

The geometry of the suspension system 20 comprises a perimeter having a perimeter length 21 around which the track 22 rotates. In the configuration of FIG. 1, suspension displacement increases the perimeter length 21 and the track tension as represented schematically by the extension of coil spring 44 and an increase in the separation between points A and B. As used herein, "perimeter length" refers to a distance traversed by an endless belt on a suspension system for a tracked vehicle. Perimeter length and track tension are directly related. An increase in perimeter length increases track tension and a decrease in perimeter length decreases track tension.

Figure 2:
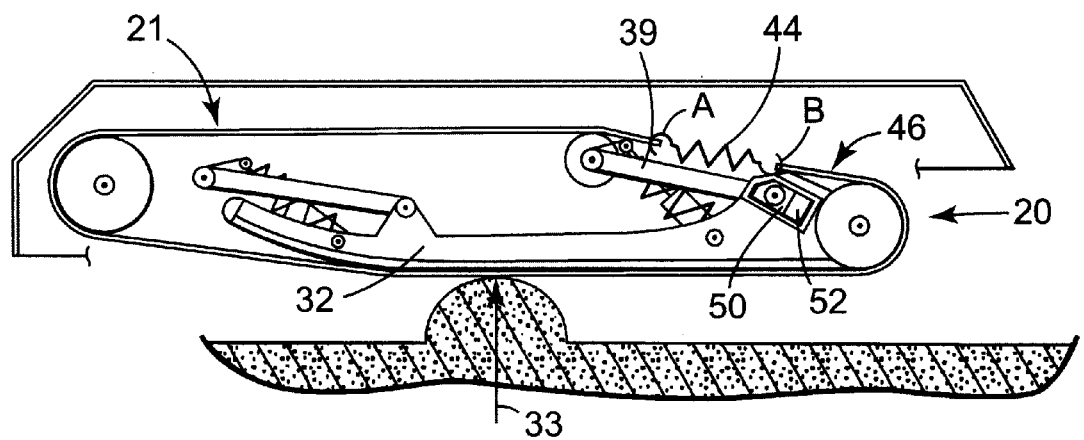
FIG. 2 is a side view of a suspension system in a horizontally compressed configuration.

FIG. 2 illustrates either a fully coupled or a partially coupled suspension system 20 collapsed in a generally horizontal configuration by force 33. In a fully coupled suspension, the coupling system 46 is fixed and permits no displacement (or minimal displacement) having a linear component of the rear suspension arm 39 relative to the suspension rail 32. In a partially coupled suspension, the coupling system 46 permits some independent movement of the rear suspension arm 39 relative to the suspension rail 32 until slide block 50 encounters the top or bottom of slot 52. Where the perimeter length 21 increases, the track tension increases as represented schematically by the extension of coil spring 44 and an increase in the separation between points A and B.

In a partially coupled suspension, coupling system 46 is activated, as illustrated by the position of slide block 50 at the top of slot 52. Once the slide block 50 has reached the limits of travel, the suspension system 20 operates similar to a fully coupled suspension. A coupling system is "activated" when the linear component of rear suspension arm displacement relative to a suspension rail reaches a mechanical limit. Subsequent displacement of the rear suspension arm is analogous to a fully coupled suspension.

Figure 3:
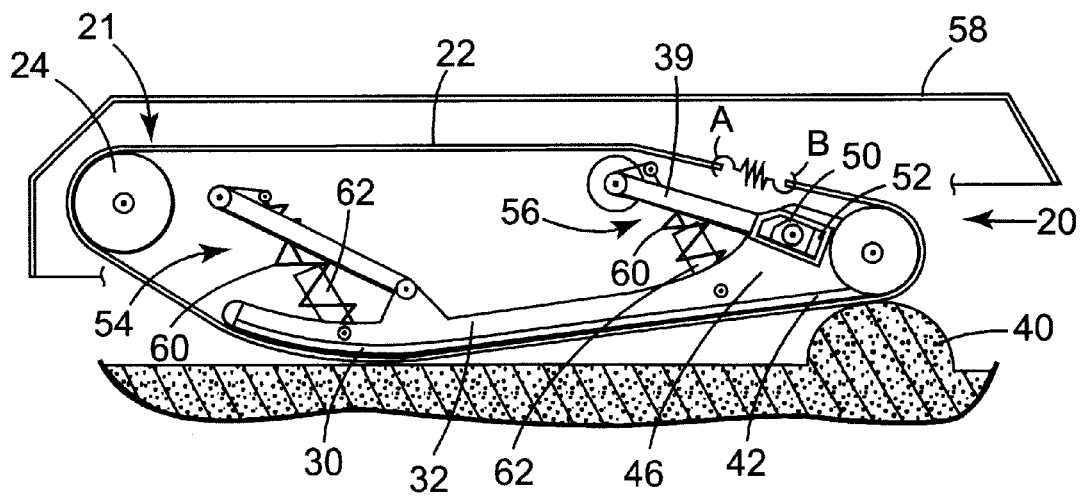
FIG. 3 is a side view of a displacement force applied near the rear portion of a suspension system.
Figure 4:
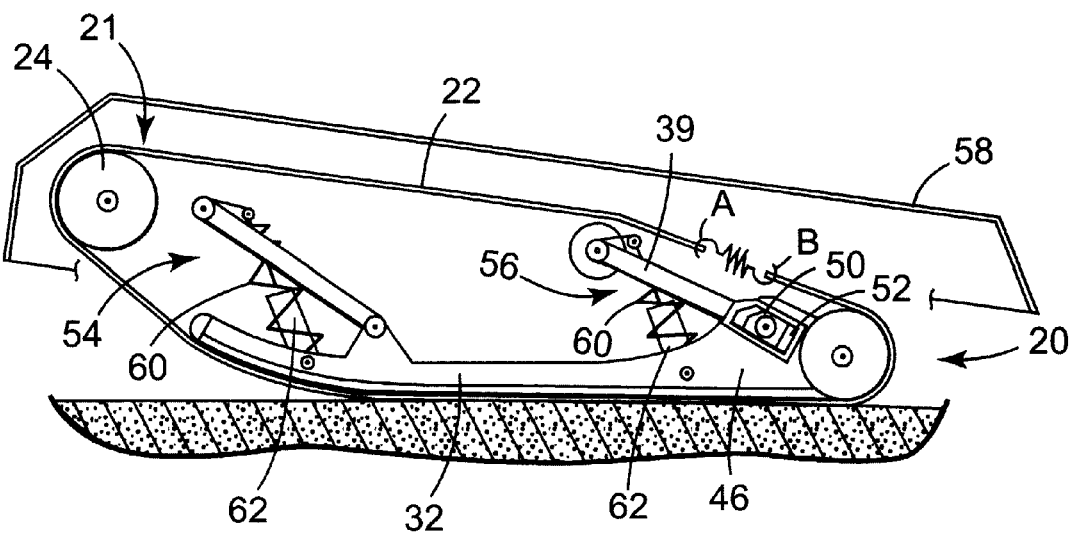
FIG. 4 is a side view of a displacement force caused by an acceleration force applied to a suspension system.

FIGS. 3 and 4 each illustrate either a non-coupled suspension or a partially coupled suspension system prior to activation. The suspension systems of FIGS. 3 and 4 are shown being subjected to a displacement force near the rear portion 42 of the suspension rail 32. In the non-coupled configuration, the slide block 50 never reaches the top or the bottom of the slot 52 during normal suspension displacement. Consequently, displacement of the rear suspension arm 39 relative to the suspension rail 32 has a linear component through the entire range of suspension displacement. A rotational displacement component may also be present. In a partially coupled suspension, the slide block 50 has not yet reached the top or bottom of the slot 52 so that the suspension system temporarily operates as a non-coupled suspension.

FIG. 3 illustrates the rear portion 42 of the suspension 20 displaced by bump 40 independent of the front portion 30. The rear portion 42 is displaced from the neutral configuration toward the chassis 58. The front portion 30 is either not displaced or is displaced less than the rear portion 42.

The configuration of FIG. 3 is referred to as a tail-bump.

FIG. 4 illustrates the rear of the suspension 20 compressed by a sudden acceleration force or by terrain configurations commonly described in the trade as a G-bumps. These bumps can be found traversing the U-shaped bottoms of ditches or gullies, or can sometimes occur when a bump on a trail has a generally rounded edge on either entry or exit or both. As used herein, "G-bump" refers to a high gravitational force applied to the suspension system and a low velocity displacement of the suspension system. The conditions corresponding to a G-bump can also be caused by sudden acceleration of the tracked vehicle. Such accelerations fall within the definition of a G-bump.

In both of these configurations, the perimeter length 21 and track tension are typically reduced. The reduction in track tension is illustrated schematically by the reduction in the distance between the points A and B. The reduction in track tension illustrated in FIGS. 3 and 4 can have a detrimental effect on two functions of the suspension 20. First, the decrease in tension reduces the grip of the drive sprocket 24 on the track 22, such that the track 22 can jump the sprocket 24. Secondly, the reduction in track tension in an uncoupled suspension system can require one of the biasing mechanisms 54, 56 to carry the entire load imparted by the force. Consequently, the springs 60 and shocks 62 are typically calibrated firmer or stiffer then nominal to resist bottoming of the suspension 20. As used herein, "bottoming" refers to a portion of a suspension system contacting an inside surface of the chassis, a suspension arm contacting against a suspension rail, or a shock absorber at a minimum compressive length. The additional biasing force required by the biasing mechanisms 54, 56 results in the suspension system 20 being firmer in calibration then would normally be required for all other riding condition, resulting in a less comfortable ride.

Compounding these problems is the fact that the biasing contribution of a shock absorbers 62 is reduced as the speed of the shock displacement is reduced. The reduced velocity displacement of the suspension system 20 in some condition reduces the shock speed to the point that a significant portion of the biasing force of the shocks 62 can be lost. This loss of shock biasing when combined with the loss of tension force from the track can cause the suspension 20 to bottom in the chassis 58, which delivers a discomfort to the rider and sometimes less control of the vehicle. Even without any loss of track tension, the loss of shock bias during reduced velocity displacement typically necessitates a supplemental biasing force. In prior suspension systems, this supplemental biasing force was provided by using stiffer springs.

The present invention provides a track tensioning system that counteracts or off-sets reductions in perimeter length and the corresponding loss of track tension. The increased track tension generates a supplemental force that augments the biasing force of the biasing mechanisms 54, 56. The supplemental force is transmitted by the endless track 22 and restrains further displacement of the suspension system 20. The supplemental force is particularly useful to compensate for the biasing force lost when the shocks 62 are compressed slowly by a G-bump or because a tail-bump is resisted primarily by the rear biasing mechanism 56, regardless of the rate of shock compression. The advantage to this arrangement is that the biasing force provided by the biasing mechanisms can be reduced to provide an overall softer ride, while the supplemental force provides sufficient force for the biasing mechanism to handle G-bump and tail-bump conditions.

If a particular suspension displacement (e.g., G-bump, tail-bump, etc.) causes the perimeter length 21 to decrease, the track tensioning system counteracts or off-sets that decrease in perimeter length 21 so that the suspension displacement results in a net increase in perimeter length 21. The net increase in perimeter length 21 resulting from the combined actions of the suspension displacement and the tensioning system is resisted by the endless belt 22, thereby augmenting the biasing mechanisms 54, 56. The net increase in perimeter length often results from the tensioning system increasing perimeter length more than the suspension displacement reduces perimeter length. The present tensioning system can also be used to prevent excessive track tensioning. That is, the tensioning system reduces perimeter length to counteract the increase in perimeter length caused by suspension displacement.

Figure 5:
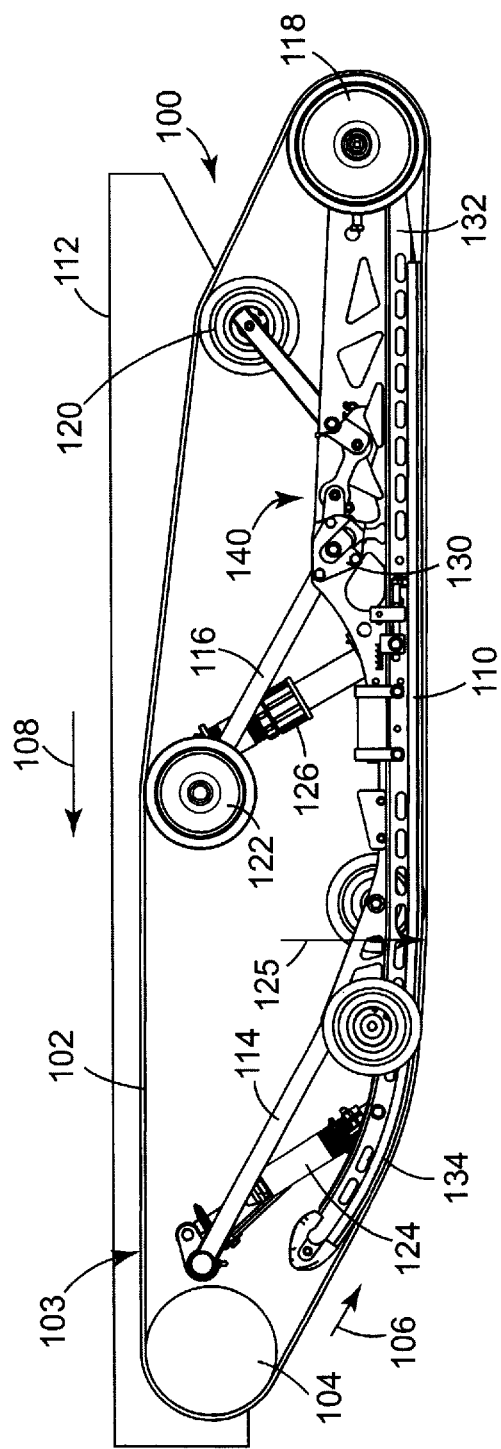
FIG. 5 is a side view of a suspension system in accordance to the present invention in a neutral configuration.

FIG. 5 is a side view of a suspension system 100 in accordance with the present invention in the neutral configuration. As used herein, "neutral configuration" refers to a suspension system at rest with the various components in a steady state. Endless track 102 travels around the circumference of drive sprocket 104 in a direction 106 opposite of direction 108 of vehicle travel. The endless track travels rearwardly from the drive sprocket 104 to at least one suspension rail 110 that is suspended from chassis 112 by front suspension arm 114 and rear suspension arm 116. The endless track 102 continues along the suspension rail 110 until it contacts rear wheel 118. The rear wheel 118 changes direction of the endless track 102 to an upward and forward direction where it is supported by tensioning wheel 120 and carrier wheel 122. The endless track 102 continues along its path until it routed back the drive wheel 104.

In the neutral configuration illustrated in FIG. 5, the suspension system 100 comprises a perimeter with a perimeter length 103. The perimeter length is illustrated as the length of the endless belt 102. Depending upon the type of suspension system (fully coupled, partially coupled or non-coupled) and the nature of the displacement force, the perimeter length 103 may increase, decrease or remain unchanged during suspension displacement.

Biasing mechanisms 124, 126 bias the suspension rail 110 away from the chassis 112. A typical biasing mechanism is a coil spring surrounding a shock absorber. Although FIGS. 5–9 illustrate two biasing mechanisms 124, 126, the present invention is equally applicable to suspension systems with a single biasing mechanism or several biasing mechanisms. Biasing mechanisms other than a coil spring surrounding the shock absorber are within the scope of the present invention.

The suspension system 100 can be fully coupled, partially coupled or non-coupled. In an embodiment where the suspension system is partially coupled, optional coupling system 130 is provided. Suitable coupling systems are disclosed in the Karpik Patents, U.S. Pat. No. 6,206,124 (Mallette), U.S. Pat. No. 5,692,579 (Peppel et al.); and U.S. Pat. No. 5,944,134 (Peppel et al.). A commercially available suspension having a suitable coupling system is available from Formula Fast Racing of Eveleth, Minnesota under the product designation "M-10". A variety of coupling systems can be used in the suspension system 100 and the present invention is not limited to those disclosed herein. For example, a coupling system can be used to couple the top of one or both of the suspension arms to the chassis.

Figure 6:
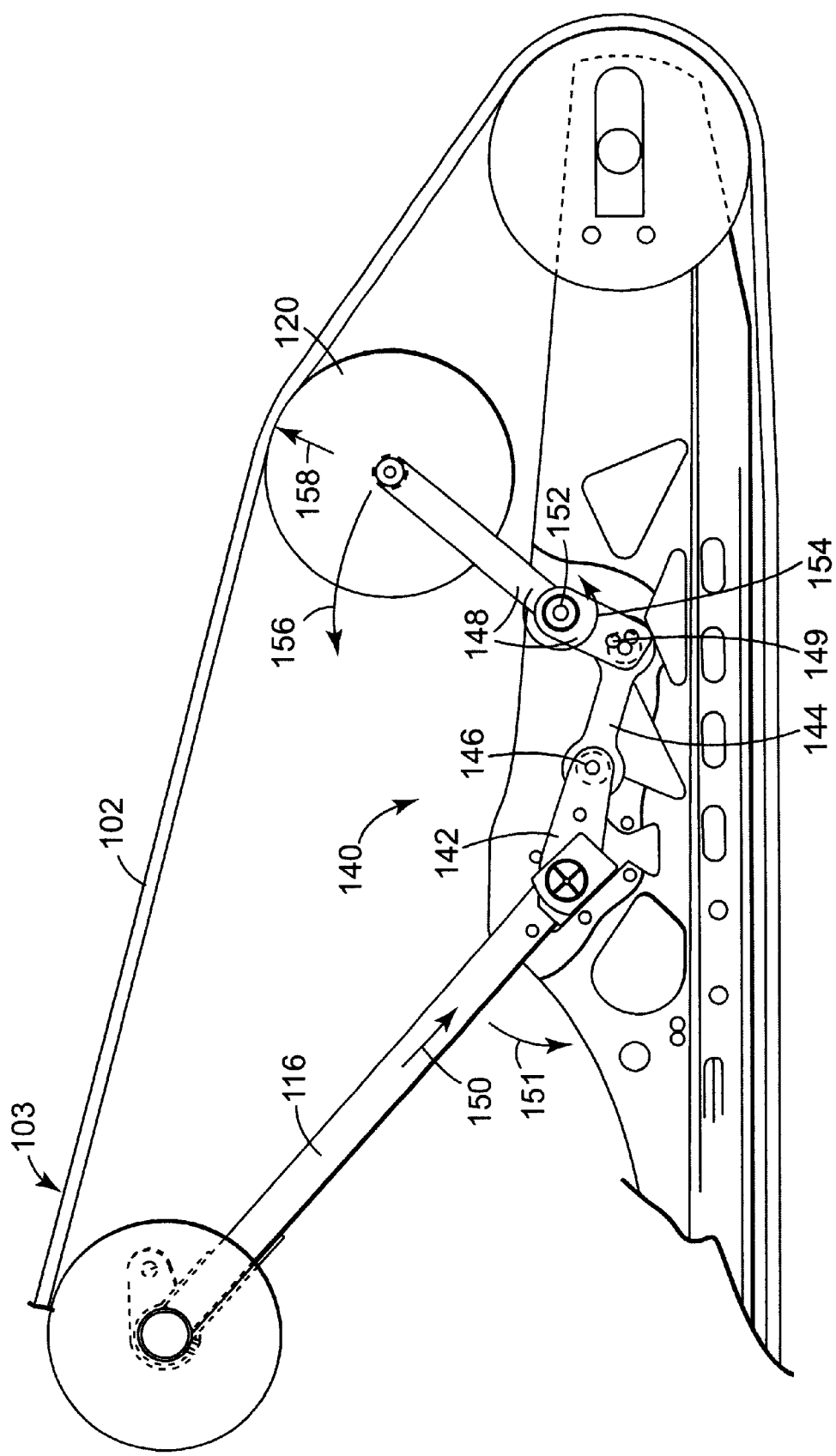
FIG. 6 is an enlarged view of the track tensioning system of FIG. 5.

In the illustrated embodiment, tensioning system 140 is coupled to the rear suspension arm 116 to selectively apply tension to the endless track 102. As best illustrated in FIG. 6, the tensioning system 140 includes an arm 142 attached to the rear suspension arm 116. Connector arm 144 is pivotable attached to the arm 142 at pivot point 146. The other end of connector arm 144 is pivotably attached to bracket 148 that supports tensioning wheel 120. FIG. 6 illustrates multiple possible pivot points 149 for attaching the second end of the connector arm 144 to the bracket 148. The various pivot points 149 are used to tune the suspension system 100. Alternatively, the tensioning system 140 can be coupled to the front suspension arm 114 (see e.g., FIG. 15).

As the rear suspension arm 116 is displaced, the arm 142 causes the connector arm 144 to rotate bracket 148 around pivot point 152 in a direction 154. The displacement of the rear suspension arm 116 can include a linear component 150, a rotational component 151, or a combination thereof. Displacement of the bracket 148 rotates the tensioning wheel 120 along an arc 156 that applies tension force 158 on the endless track 102 and increases the perimeter length 103 of the suspension system 100. As used herein, "tensioning system" refers to a system that increases or decreases track tension and perimeter length on a suspension system. In some embodiments, suspension displacement can result in a decrease in perimeter length that is counteracted by the tensioning system, so that there is no net increase in perimeter length or track tension. Typically, however, the tensioning system provides a net increase in perimeter length in excess of any decrease in perimeter length caused by suspension displacement.

In those embodiment where suspension displacement results in a decrease in the perimeter length 103, the track tensioning system 140 counteracts that decrease in perimeter length 103 so that there is a net increase in perimeter length 103 during suspension displacement. The result is that perimeter length 103 increases during suspension displacement. By increasing the perimeter length 103 during suspension displacement, the corresponding increase in track tension creates a supplemental force 125 that resists further suspension displacement and augments the biasing forces generated by the biasing mechanisms 124, 126. For the sake of clarity, the supplemental force 125 is illustrated schematically as creating a downward bias on the suspension rail 110. In practice, however, the supplemental force 125 is an inwardly compressive force transmitted by the track 102 to the various components of the suspension system 100 supporting the track 102 that resists further increases in perimeter length 103. That is, the supplemental force 125 is not localized, but rather resists further increases in the perimeter length 103, and thereby resists displacement of the various components throughout the suspension system 100.

In an embodiment where the rear suspension arm 116 is coupled to the suspension rail 110 by coupling system 130, the linear component 150 of rear suspension arm 116 displacement generally causes the track tensioning system 140 to increase track tension and the perimeter length 103, although the rotational component 151 may also contribute. That is, activation of the coupling system 130 causes an increase in perimeter length 103 that is resisted by the track 102.

In an embodiment of a suspension system without the coupling system 130, the track tensioning system 140 can increase track tension and perimeter length 103 when displacement of the rear portion 132 of the suspension rail 110 toward the chassis 112 is greater than the displacement of the front portion 134. That is, the track tensioning system 140 increases track tension and perimeter length 103 when the suspension rail 140 is tipped up in the rear relative to the chassis 112 (see FIGS. 7 and 8). The track tensioning system 140 can alternately increase track tension when the front suspension arm 114 is displaced.

A variety of other mechanism and/or conditions can be used to cause the track tensioning system 140 to increase track tension and perimeter length 103. In one embodiment, the track tensioning system 140 applies a tensioning force to the endless track 102 and an increase in perimeter length 103 in response to a displacement of the rear portion 132 of the suspension rail 110 greater than a displacement of a front portion 134 of the suspension rail. The track tensioning system 140 can also be triggered when the suspension rail experiences a G-bump or a tail bump (see FIG. 7).

Figure 7:
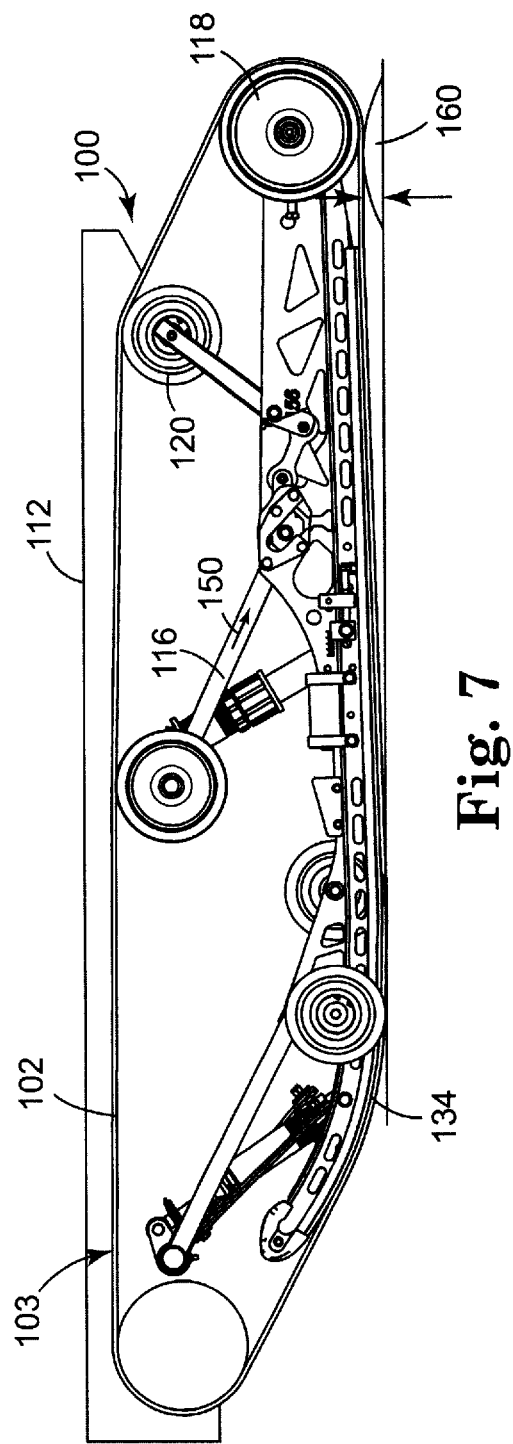
FIG. 7 is side view of the suspension system of FIG. 5 with a displacement force applied near the rear portion.

FIG. 7 illustrates the suspension 100 with the rear wheel 118 displaced towards the chassis 112 by either a bump 160 or acceleration of the tracked vehicle. The front portion 134 is not displaced or is displaced less than the displacement of the rear portion 132 of the suspension rail 110. The differential of displacement between the rear portion 132 and the front portion 134 causes the rear suspension arm 116 to be displaced generally in the direction 150, as discussed above. The resulting movement of the tensioning wheel 120 can increases the tension on the endless track 102 above the level of neutral tension. In an embodiment where further displacement of the rear portion 132 towards the chassis 112 increases perimeter length 103, the endless track 102 resists that suspension displacement.

FIG. 8 illustrates the suspension system 100 with the rear portion 132 displaced an even greater amount than illustrated in FIG. 7. The additional displacement of the rear portion 132 towards the chassis 112 causes further displacement of the rear suspension arm 116 generally in the direction 150. The tensioning wheel 120 is advanced further along the arc 156 and the tensioning force 158 is increased. Consequently, the supplemental force 125 provided by track tension increases to further augment the biasing force of the biasing mechanisms 124, 126.

In the illustrated embodiment, the amount of tension on the endless track 102 and the perimeter length 103 increases with displacement of the rear portion 132 relative to the chassis 112. In the embodiment of FIG. 8, the carrier wheel 122 is now separated from the endless track 102 by a gap 162. The tensioning wheel 120 becomes the primary support of the endless track 102 in the region above the suspension 100.

The increase or decrease in perimeter length due to suspension displacement may not be linear. In some suspension systems, each incremental amount of suspension displacement may or may not result in a corresponding increase/decrease in perimeter length. The present tensioning system 140 can be tuned to compensate for irregular changes in perimeter length throughout the fully range of suspension displacement. Whether the tensioning system 140 increases or decreases perimeter length at various stages of suspension displacement is of course a function of the suspension geometry.

FIG. 9 is a side sectional view of the suspension 100 in a horizontally compressed configuration. This geometry typically results in an increase track tension and perimeter length. Consequently, the tensioning wheel 120 is folded down towards the suspension rail 110 so as to not over-tension the track 102. In an alternate embodiment where the track tension is reduced in the horizontally compressed configuration of FIG. 9, the track tensioning system 140 can be calibrated to increase track tension.

In any embodiment where track tension is increased during suspension displacement, the present tensioning system 140 can be used to reduce track tension and perimeter length. The ability of the present invention to prevent excessive track tension applies to fully coupled, non-coupled and partially coupled suspension systems.

In the embodiments of FIGS. 5 through 9, the amount of tension applied to the endless track 102 varies with the configuration of the suspension system 100. In the configuration of FIG. 7, the rear wheel 118 is displaced about 50 millimeters. The additional tension applied to the track 102 by the tensioning wheel 120 increases the overall length of the track 102 by about 0.2 inches. Viewed from another perspective, the tensioning system 140 provides a net increase in perimeter length 103 of the suspension system 100 of about 0.2 inches.

As additional displacement of the rear portion 132 of the suspension rail 110 is encountered, the tensioning wheel 120 increases the tension on the track 102. In the configuration of FIG. 8, the rear wheel 118 has been displaced about 200 millimeters. The endless track 102 has been increased in length by about 1 inch. Alternatively, the tensioning system 140 can be viewed as causing a net increase in the perimeter length 103 of the suspension system 100 of about 1 inch.

Finally, by folding the tension wheel 120 down towards the suspension rail 110, the amount of tension on the track 102 is reduced from the level provided in the configuration of FIG. 8. In the illustrated embodiment, the endless track 102 has been increased in length by about 0.4 inches in the configuration of FIG. 9 (or the perimeter length 103 has realized a net increase of about 0.4 inches).

The amount of tension generated by the tensioning system 140 in the present suspension system 100 is sufficiently small that there is no substantial risk of damage to the track 102. Additionally, the quality of tracks has improved significantly over the last decade so that they are better able to handle the levels of tension applied by the track tensioning system.

An additional benefit from the track tensioning system 140 is an ability to increase the overall vertical displacements of the suspension system 100, while still being able to maintain the desired tensions in the track 102. Without the track tensioning system 140, large displacement suspension would not be possible, as the track 102 would become to loose and or to tight at the extreme front or rear displacements. The present tensioning system 140 is particularly effective in tensioning suspension systems with a displacement of about ten inches or more.

Figure 10:
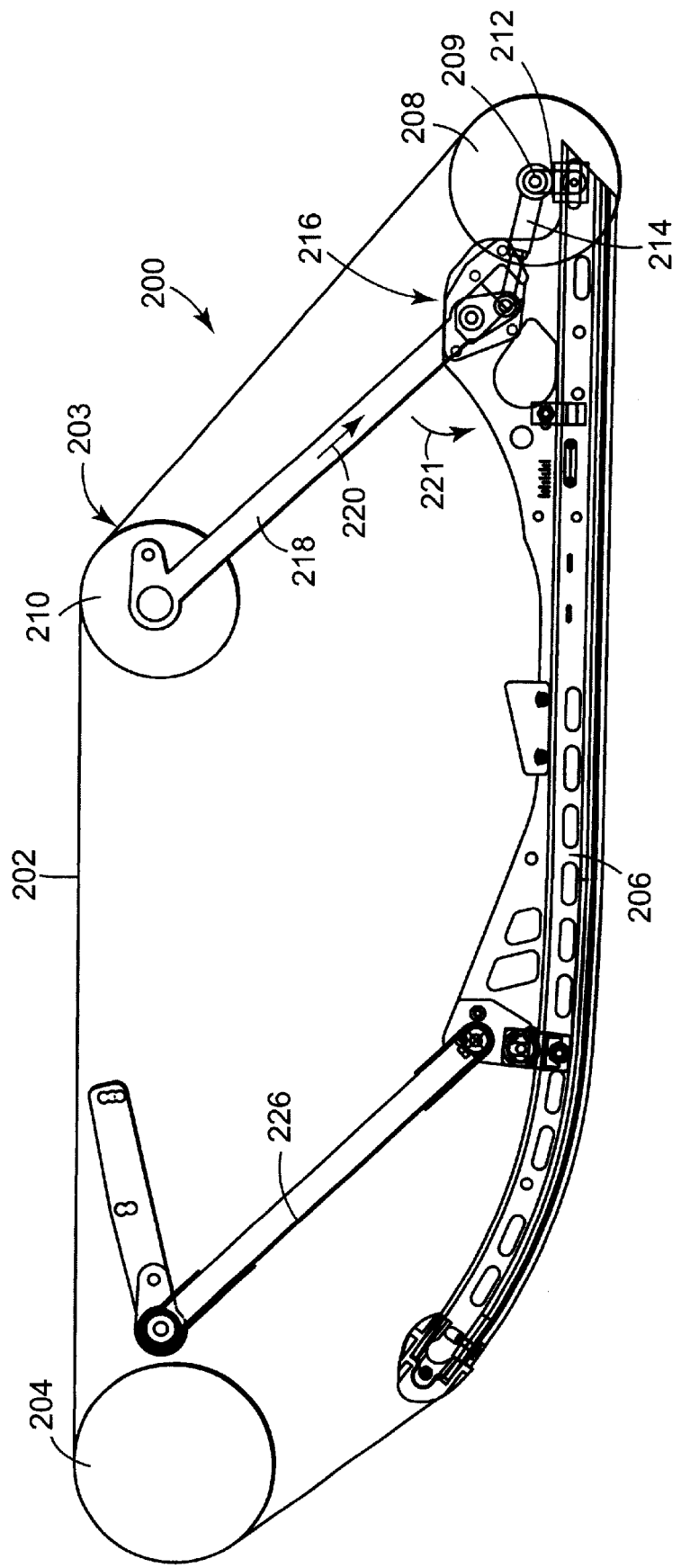
FIG. 10 is a side view of an alternate suspension system in accordance to the present invention in a neutral configuration.
Figure 11:
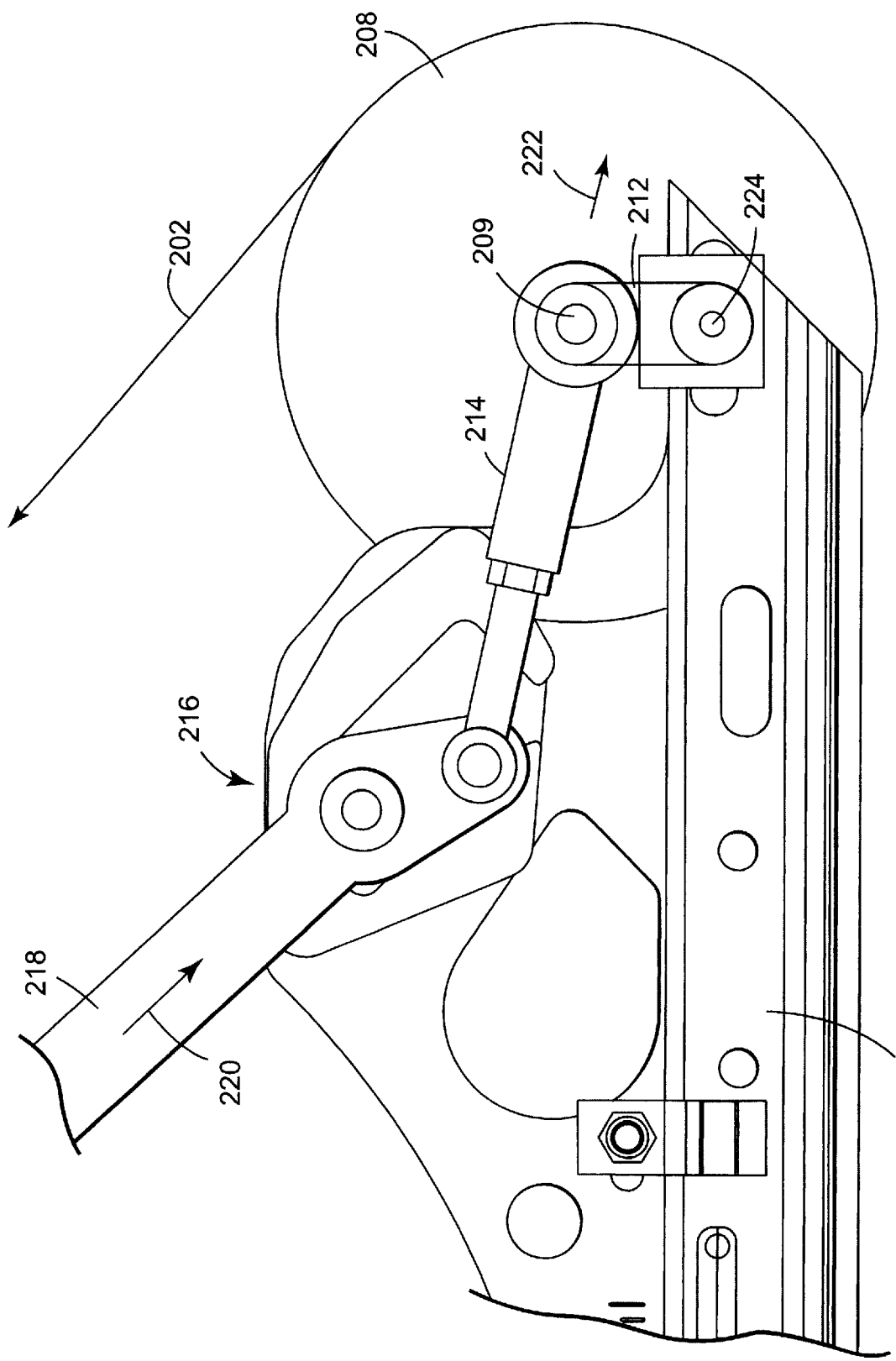
FIG. 11 is an enlarged view of the track tensioning system of FIG. 10.

FIGS 10 and 11 illustrate and alternate suspension system 200 in accordance with the present invention. The suspension system 200 can be fully coupled, partially coupled or non-coupled. As discussed above, endless track 202 is driven by drive wheel 204 along a suspension rail 206 around a rear wheel 208. Carrier wheel 210 delivers the endless track 202 back to the drive wheel 204.

In the embodiments of FIGS. 10 and 11, the rear wheel 208 is pivotably mounted to the suspension rail 206 by member 212. The member 212 is attached to the suspension rail 206 at pivot point 224. Connector arm 214 is mechanically coupled at a first end to the front or rear suspension arms 226, 218 or to optional coupling system 216. Second end of connector arm 214 can be coupled to axle 209 of the rear wheel 208, the rear wheel 208 or the member 212. As the rear suspension arm 218 is displaced generally in the direction 220 and/or the direction 221, the connector arm 214 displaces the rear wheel 208 generally in a direction 222, thereby increasing tension on the track 202 and perimeter length 203 of the suspension system 200. The connector arm 214 is preferably adjustable in length so as to permit tuning of the track tension.

Figure 12:
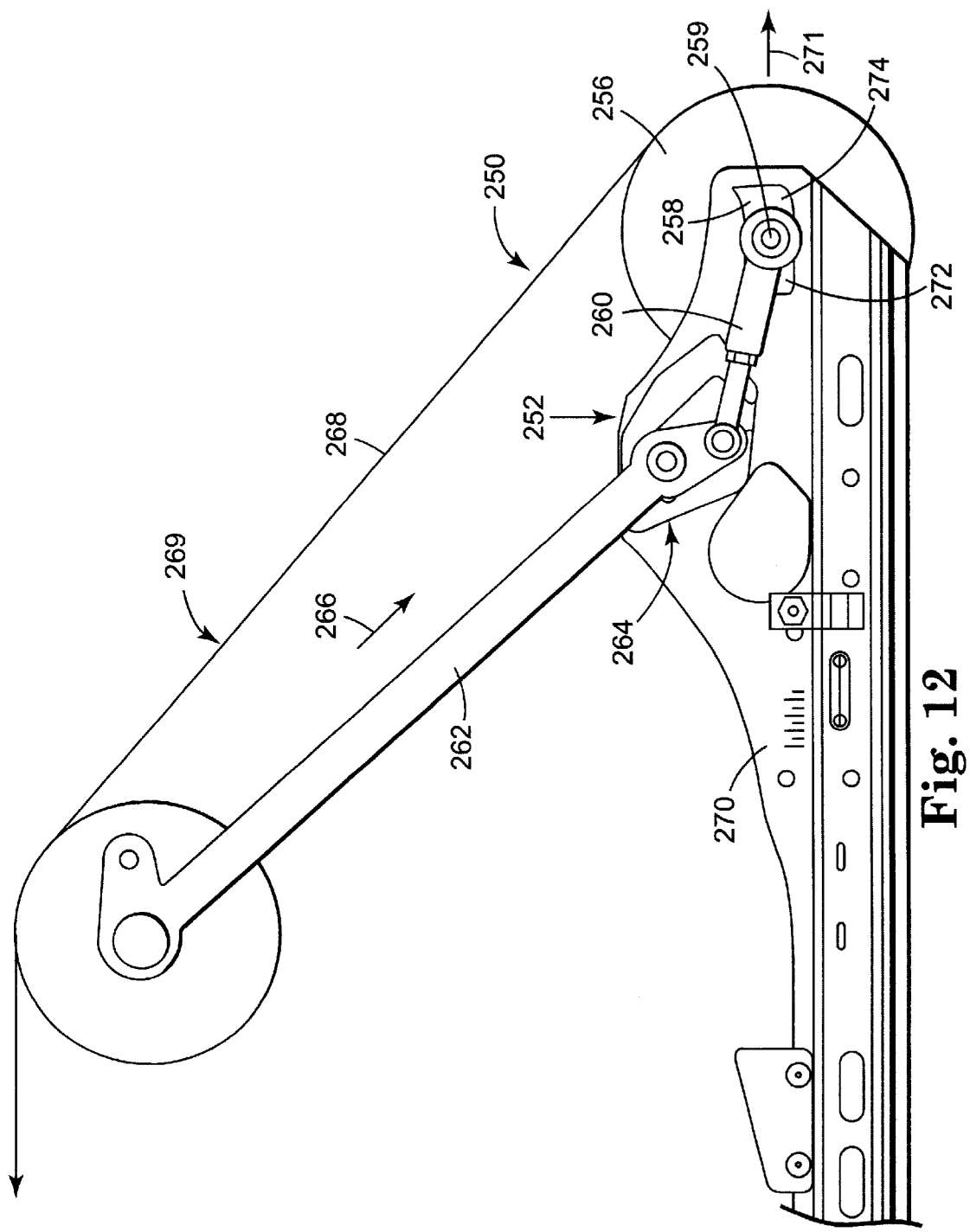
FIG. 12 is an enlarged view of a track tensioning system with a slot in a suspension rail that retains an axle of a rear wheel in accordance with the present invention.

FIG. 12 is a schematic illustration of a suspension system 250 with an alternate track tensioning system 252. The suspension system 250 can be fully coupled, partially coupled or non-coupled. Axle 259 for the rear wheel 256 resides in a slot 258 in suspension rail 270. Connecting arm 260 couples the axle 259 to rear suspension arm 262. When the rear suspension arm 262 is displace and/or the optional coupling system 264 is activated, rear suspension arm 262 is moved generally in the direction 266. Displacement of the rear suspension arm 262 may also include a rotational component. The displacement of the rear suspension arm 262 is transmitted to the rear wheel 256 by the connecting arm 260, thereby increasing the tension on the track 268 and the perimeter length 269 of the suspension system 250.

The slot 258 is illustrated as having a generally horizontal portion 272 and an non-horizontal portion 274. In the illustrated embodiment, the non-horizontal portion 274 has a slight upward curve. Alternatively, the non-horizontal portion can be a linear portion angled upward or downward relative to horizontal. As the axle 259 traverses the horizontal portion 272 generally in the direction 271, the incremental increase in track tension and perimeter length 269 is generally constant. As the axle 259 traverses the curved portion 274, however, the additional increase in track tension and perimeter length can be different than a corresponding amount of track tension and perimeter length increase caused by displacement of axle 259 along the horizontal portion 272. By changing the shape of the slot 258, amount of track tension and perimeter length can increase or decrease with the displacement of the rear wheel 256. For example, if displacement of the rear wheel 256 by the rear suspension arm 262 is divided into three equal increments, the increment increase in track tension can be varied along each increment depending upon the shape of the slot 258.

Figure 13:
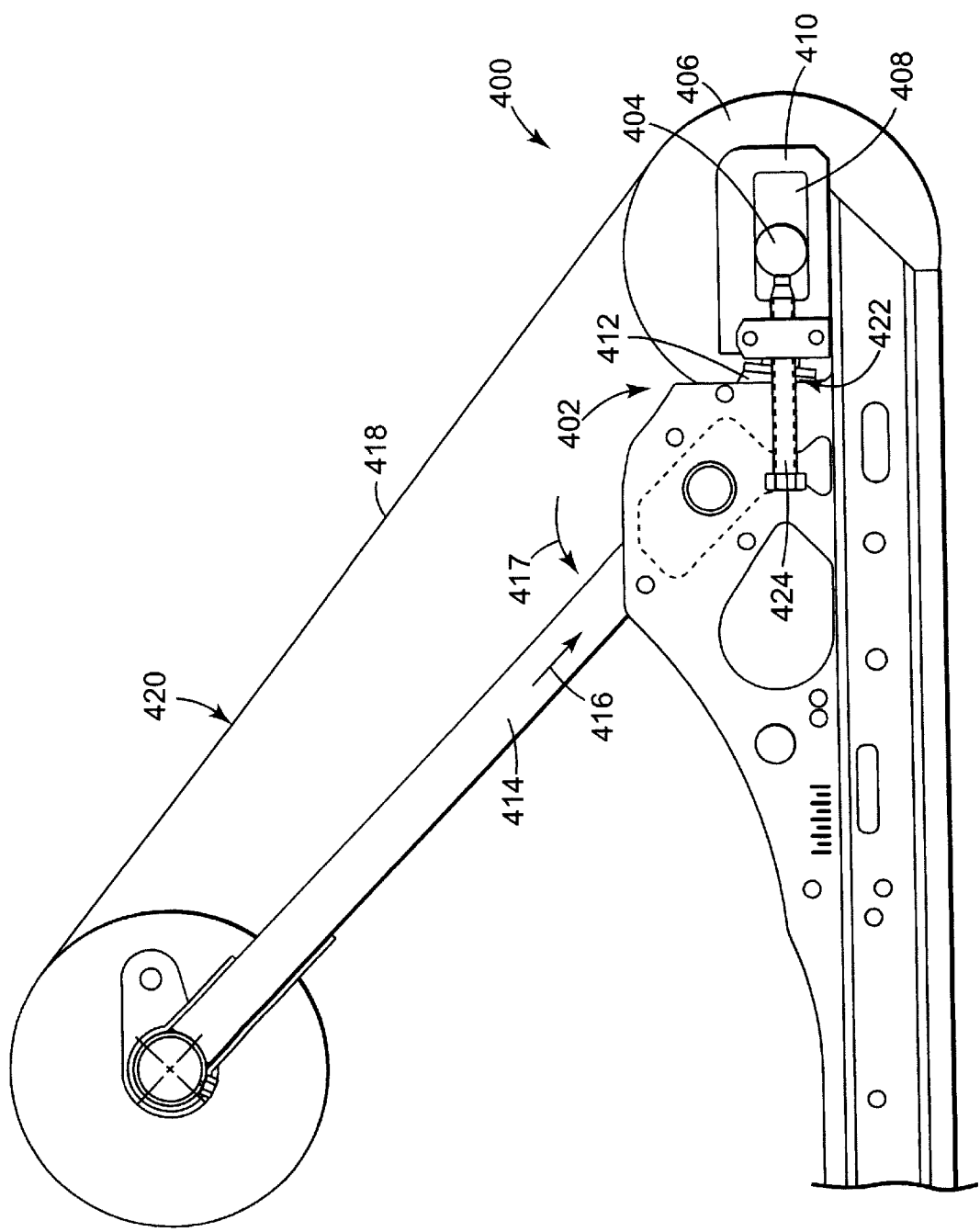
FIG. 13 is an enlarged view of a track tensioning system with a sliding member in accordance with the present invention.

FIG. 13 is a schematic illustration of a suspension system 400 with an alternate track tensioning system 402. The suspension system 400 can be fully coupled, partially coupled or non-coupled. Axle 404 for the rear wheel 406 resides in a slot 408 in sliding member 410. Alternate slot configurations such as discussed in connection with FIG. 12 can be used on the sliding member 410. Connecting arm 412 couples the sliding member 410 to rear suspension arm 414. Sliding member 410 includes static track tensioning assembly 422. In the illustrated embodiment, the static track tensioning assembly 422 includes a threaded member 424 that contact with the axle 404. The threaded member 424 can be positioned in the sliding member 410 to increase or decrease static tension of track 418. Track adjustment is typically done while the suspension system 400 is in the neutral configuration. A variety of other static track tensioning assemblies can be used with the present track tensioning system 402.

When the rear suspension arm 414 is displaced, rear suspension arm 414 is moved generally in the directions 416 and/or 417. The displacement of the rear suspension arm 414 displaces the sliding member 410 (and the static track tensioning assembly 422), thereby increasing the tension on the track 418 and the perimeter length 420 of the suspension system 400.

Figure 14:
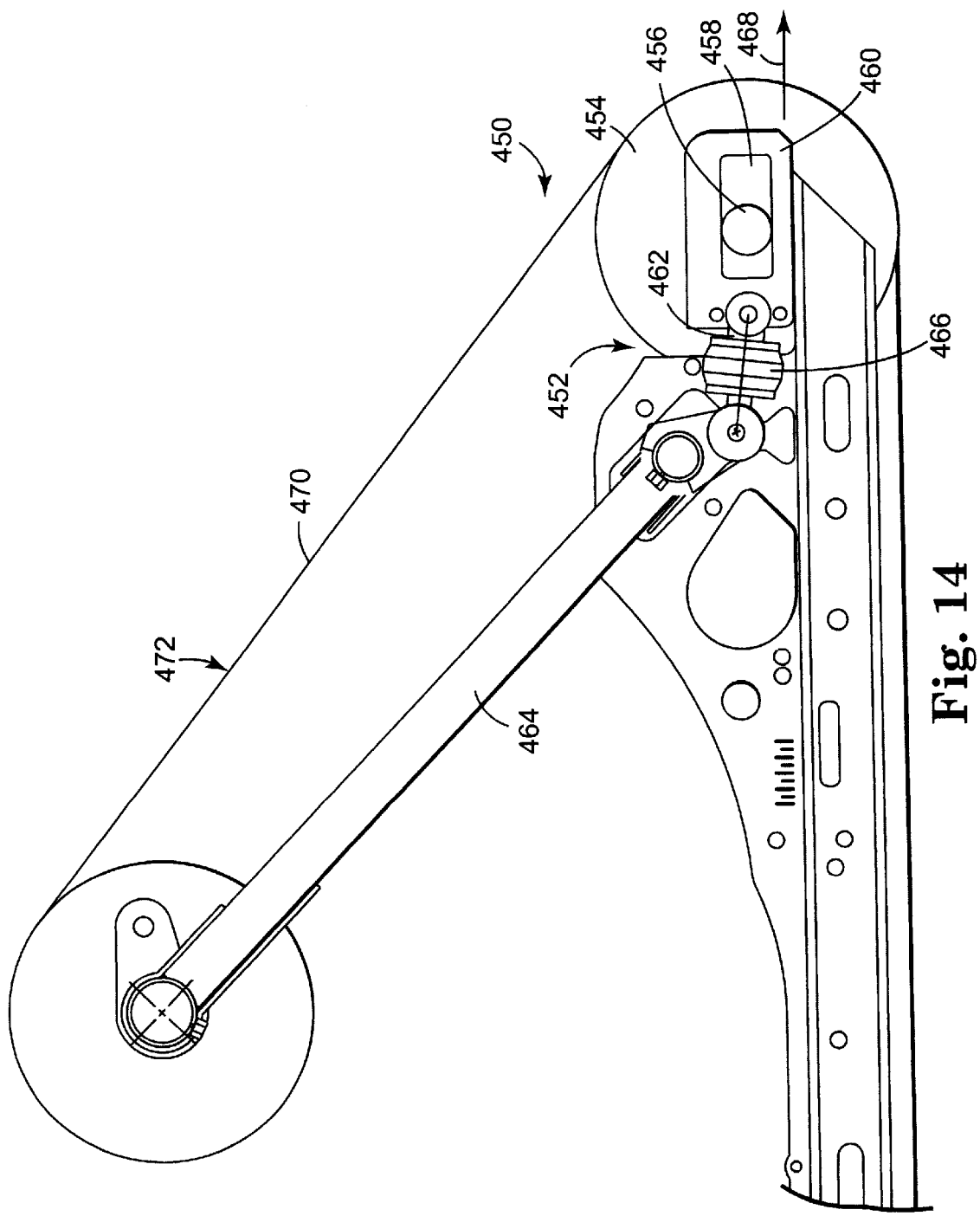
FIG. 14 is an enlarged view of a track tensioning system with an elastic connecting arm in accordance with the present invention.

FIG. 14 is a schematic illustration of a suspension system 450 with an alternate track tensioning system 452. The suspension system 450 can be fully coupled, partially coupled or non-coupled. Axle 456 for the rear wheel 454 resides in a slot 458 in sliding member 460 as discussed in connection with FIG. 13. Connecting arm 462 still couples the sliding member 460 to rear suspension arm 464, except that the connector arm 462 includes an elastic member 466 that compresses during the initial displacement of the rear suspension arm 464. Consequently, the initial displacement of the rear suspension arm 464 results in little or no displacement of the sliding member 460. Once the elastic member 466 is substantially compressed, the sliding member 460 will be displace in the direction 468, resulting in an increase in tension on track 470 and an increase in perimeter length 472. The elastic member 466 can be a spring, shock absorber, elastomeric material, or a variety of other members. The Durometer value of an elastic member 466 constructed from an elastomeric material can be engineered so that any increase in track tension and perimeter length is delayed until the rear suspension arm 464 is displaced a predetermined amount. In another embodiment, the elastic member 466 compresses during most or all of the displacement of the sliding member 460. Any of the connector arms disclosed herein can include an elastic portion, such as discussed above.

Figure 15:
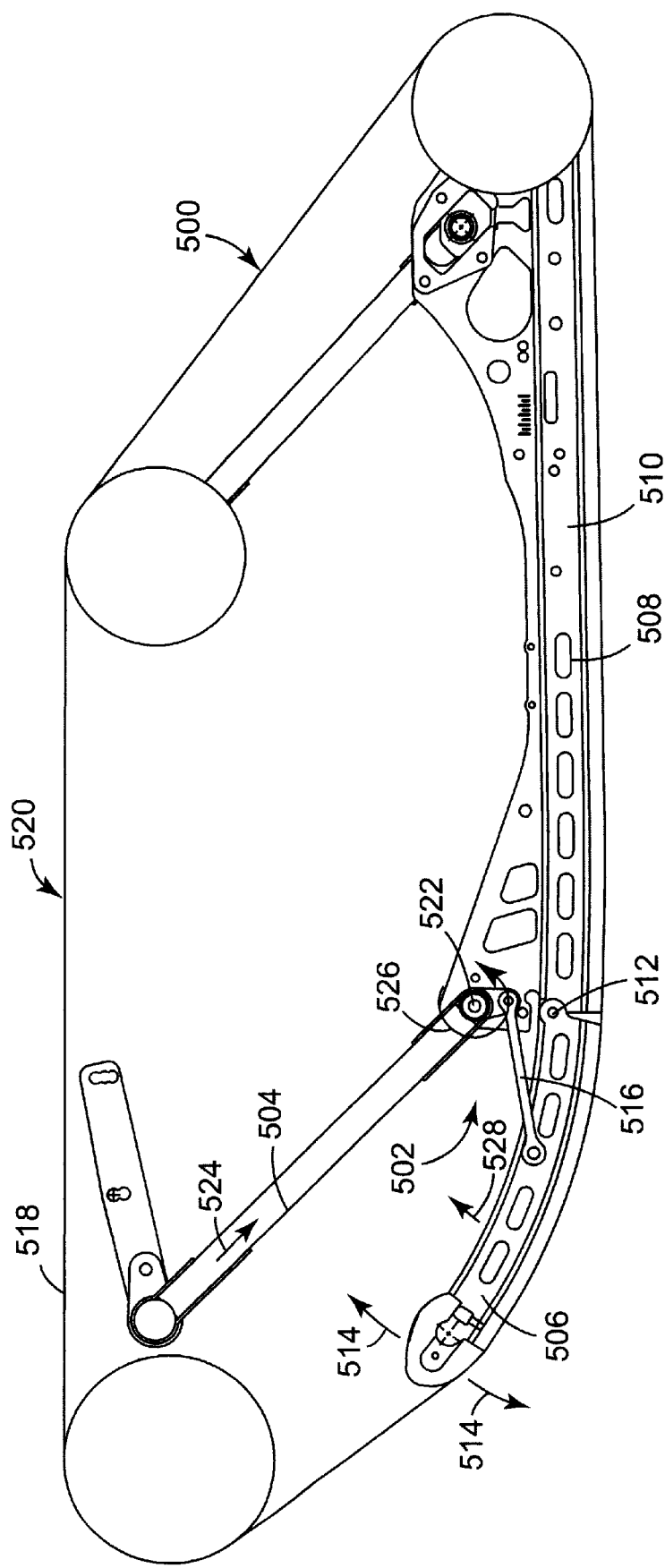
FIG. 15 is an enlarged view of a track tensioning system with a pivoting front portion of the suspension rail in accordance with the present invention.

FIG. 15 is a schematic illustration of an alternate suspension system 500 in which tensioning system 502 is coupled to front suspension arm 504. Front portion 506 of suspension rail 508 is pivotally attached to rear portion 510 at pivot 512. The pivot 512 permits the front portion 506 to move along arc 514. Connector arm 516 couples the front suspension arm 504 to the front portion 506. Displacement of the front suspension arm 504 causes the front portion 506 to move along arc 514, thereby increasing or decreasing tension on track 518 and perimeter length 520.

Displacement of front suspension arm 504 can be rotational around pivot 522 or may include a linear component 524. In one embodiment, the front suspension arm 504 is connected to the suspension rail 508 using one of the coupling systems discussed herein. In the illustrated embodiment, rotation of the front suspension arm 504 in direction 526 causes front portion 506 to move in direction 528. The resulting increase in perimeter length 520 is resisted by the endless track 518.

The present suspension system is not limited to the track tensioning system disclosed herein. In yet another embodiment, it is possible to displace the entire suspension rail at various mounting points at the chassis and/or the suspension rail to increase the tension on the track. In another embodiment, it is possible to displace the drive axle for the drive wheel to increase track tension. Various other track tensioning schemes are contemplated by the present invention. The present suspension system is also not limited to those having two suspension arms. Suspension systems with one or more suspension arms can be used with the present tensioning system.

Figure 16:
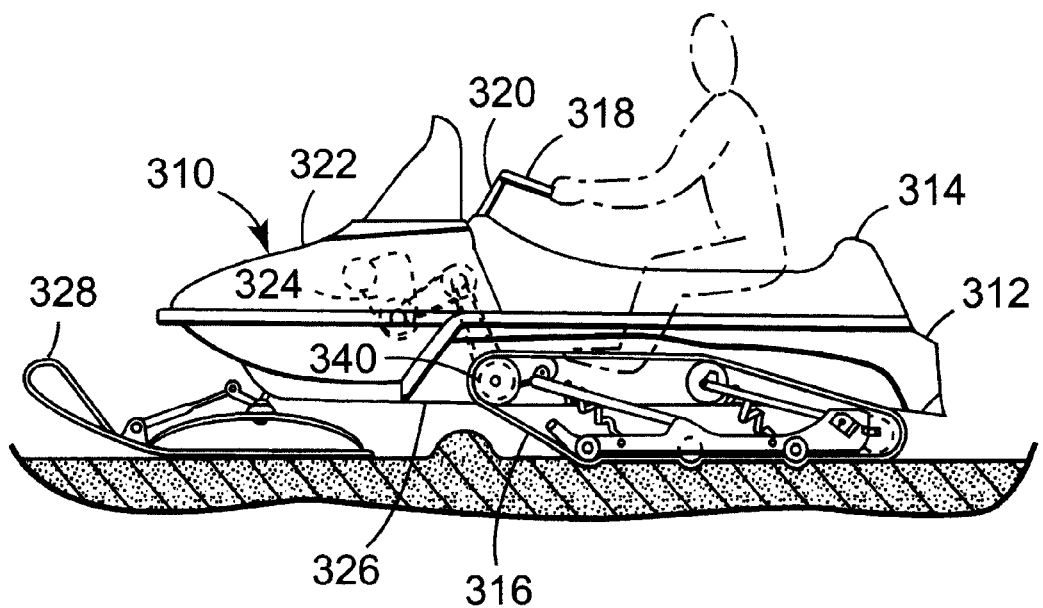
FIG. 16 is a side view of a snowmobile assembly equipped with a suspension system according to the present invention.

FIG. 16 illustrates a snowmobile 310 using a suspension system 316 with a track tensioning system in accordance with the present invention. The snowmobile 310 includes a body frame or chassis 312 that mounts a seat 314 on the upper side thereof. When seated on the snowmobile seat 314, a driver manually steers the vehicle 310 by a handlebar assembly 318 that is secured to a steering shaft 320 which extends through a compartment 322 for the internal combustion engine 324 and inside belly pan 326. The steering shaft 320 is coupled to a pair of steerable skis 328 through suitable steering linkage, preferably arranged so that the inside cornering ski 328 turns at a greater angle than the outside ski 328 of the turn to provide comfortable steering. Also, a forward angling of the ski support legs causes the steering skis 328 to bank into turns for improved maneuverability and handling. The belly pan 326 curves rearwardly to the forward end of the endless track assembly 316 driven by drive wheel 340 of the vehicle 310. The full weight of the driver and a major percentage of the vehicle weight rides directly over the track assembly 316 for improved traction.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A suspension system for suspending an endless track beneath a tracked vehicle chassis, the suspension system comprising:

at least one elongated suspension rail having a front portion, a rear portion and a bottom track engaging portion;

at least one suspension arm having an upper end adapted for pivotal connection to the vehicle chassis and a lower end pivotally connected to the suspension rail;

a biasing mechanism adapted to provide a biasing force that biases the suspension rail away from the vehicle chassis; and a track tensioning system coupled to the suspension arm that applies a tensioning force to the endless track in response to displacement of the suspension arm, the tensioning force generating a supplemental force transmitted by the endless track that augments the biasing force of the biasing mechanism.

2. The suspension system of claim 1 wherein the displacement of the suspension arm comprises a linear component.

3. The suspension system of claim 1 wherein the supplemental force is proportional to a magnitude of the displacement of the suspension arm.

4. The suspension system of claim 1 wherein the supplemental force is not proportional to a magnitude of the displacement of the suspension arm.

5. The suspension system of claim 1 wherein the track tensioning system comprises:

a tensioning wheel engaged with an inside surface of the endless track; and a bracket pivotally coupled to the suspension system supporting the tensioning wheel at a first end and coupled to the suspension arm at a second end.

6. The suspension system of claim 1 wherein the track tensioning system comprises:

a rear wheel pivotally mounted to the rear portion of the suspension rail; and a connector arm coupled to the suspension arm at a first end and to the rear wheel at a second end.

7. The suspension system of claim 1 wherein the track tensioning system comprises:

a rear wheel slidingly engaged with the rear portion of the suspension rail; and a connector arm coupled to the suspension arm at a first end and the rear wheel at a second end.

8. The suspension system of claim 1 wherein the track tensioning system comprises:

a rear wheel on an axle, the axle slidingly engaged with a slot on the rear portion of the suspension rail; and a connector arm coupled to the suspension arm at a first end and the axle at a second end.

9. The suspension system of claim 8 wherein the slot comprises a horizontal portion.

10. The suspension system of claim 8 wherein the slot comprises a horizontal portion and a non-horizontal portion.

11. The suspension system of claim 1 wherein the track tensioning system comprises:

a rear wheel slidingly engaged with a sliding member on the rear portion of the suspension rail; and a connector arm coupled to the suspension arm at a first end and the sliding member at a second end.

12. The suspension system of claim 11 wherein the sliding member includes a static track tensioning assembly.

13. The suspension system of claim 11 wherein the connector arm comprises an elastic portion.

14. The suspension system of claim 1 wherein the track tensioning system comprises:

a pivot connecting the front portion of the suspension rail to the rear portion; and a connector arm coupled to the suspension arm at a first end and the front portion of the suspension rail at a second end.

15. The suspension system of claim 14 wherein the connector arm is coupled to a front suspension arm.

16. The suspension system of claim 1 wherein the track tensioning system is coupled to the suspension arm using an elastic member.

17. The suspension system of claim 1 comprising a coupling system permitting a displacement of the suspension arm that includes a non-linear component.

18. The suspension system of claim 1 wherein the suspension arm and the suspension rail comprise a fully coupled suspension system.

19. The suspension system of claim 1 wherein the suspension arm and the suspension rail comprise a non-coupled suspension system.

20. The suspension system of claim 1 wherein the suspension arm and the suspension rail comprise a partially coupled suspension system.

21. The suspension system of claim 1 wherein the suspension arm comprises a front suspension arm and a rear suspension arm, the track tensioning system being coupled to the rear suspension arm.

22. The suspension system of claim 1 wherein the suspension arm comprises a front suspension arm and a rear suspension arm, the track tensioning system being coupled to the front suspension arm.

23. The suspension system of claim 1 wherein the supplemental force comprises a compressive force on the suspension system.

24. The suspension system of claim 1 wherein the supplemental force comprises a compressive force that resists an increase in perimeter length of the suspension system during suspension displacement.

25. The suspension system of claim 1 wherein the tensioning system decreases the tensioning force on the track in response to a decrease in perimeter length during suspension displacement.

26. A suspension system for suspending an endless track beneath a tracked vehicle chassis, the suspension system comprising:

at least one elongated suspension rail having a front portion, a rear portion and a bottom track engaging portion;

at least one suspension arm having an upper end adapted for pivotal connection to the vehicle chassis and a lower end pivotally connected to the suspension rail;

a biasing mechanism adapted to provide a biasing force to bias the suspension rail away from the vehicle chassis;and a track tensioning system that applies a tensioning force to the endless track in response to a displacement of the rear portion of the suspension rail greater than a displacement of a front portion of the suspension rail, the tensioning force generating a supplemental force that augments the biasing force of the biasing mechanism.

27. A suspension system for suspending an endless track beneath a tracked vehicle chassis, the suspension system comprising:

at least one elongated suspension rail having a front portion, a rear portion and a bottom track engaging portion;

a front suspension arm having an upper end adapted for pivotal connection to the vehicle chassis and a lower end pivotally connected to the suspension rail;

a rear suspension arm having an upper end for pivotal connection to the vehicle chassis and a lower end pivotally connected to the suspension rail;

a biasing mechanism adapted to provide a biasing force to bias the suspension rail away from the vehicle chassis; and a track tensioning system coupled to one of the suspension arms that applies a tensioning force to the endless track in response to a G-bump on the suspension rail, the tensioning force generation a supplemental force that augments the biasing force of the biasing mechanism.

28. A suspension system for suspending an endless track beneath a tracked vehicle chassis, the suspension system comprising:

at least one elongated suspension rail having a front portion, a rear portion and a bottom track engaging portion;

a front suspension arm having an upper end adapted for pivotal connection to the vehicle chassis and a lower end pivotally connected to the suspension rail;

a rear suspension arm having an upper end for pivotal connection to the vehicle chassis and a lower end pivotally connected to the suspension rail;

a biasing mechanism adapted to provide a biasing force to bias the suspension rail away from the vehicle chassis; and a track tensioning system coupled to one of the suspension arms that applies a tensioning force to the endless track in response to a G-bump on the suspension rail, the tensioning force generating a supplemental force that augments the biasing force of the biasing mechanism.

29. A suspension system for suspending an endless track beneath a tracked vehicle chassis, the suspension system comprising:

at least one elongated suspension rail having a front portion, a rear portion and a bottom track engaging portion;

a front suspension arm having an upper end adapted for pivotal connection to the vehicle chassis and a lower end pivotally connected to the suspension rail;

a rear suspension arm having an upper end for pivotal connection to the vehicle chassis and a lower end pivotally connected to the suspension rail;

a biasing mechanism adapted to provide a biasing force that biases the suspension rail away from the vehicle chassis; and a track tensioning system coupled to one of the suspension arms that applies a tensioning force to the endless track in response to displacement of the suspension arm, the tensioning force generating a supplemental force transmitted by the endless track that augments the biasing force of the biasing mechanism.

30. A suspension system for suspending an endless track beneath a tracked vehicle chassis, the suspension system comprising:

- at least one elongated suspension rail having a front portion, a rear portion and a bottom track engaging portion;
- at least one suspension arm having an upper end adapted for pivotal connection to the vehicle chassis and a lower end pivotally connected to the suspension rail;
- a biasing mechanism adapted to provide a biasing force that biases the suspension rail away from the vehicle chassis; and
- a track tensioning system coupled to the suspension arm that increases a perimeter length of the suspension system in response to displacement of the suspension arm, the increase in perimeter length generating a supplemental force transmitted by the endless track that augments the biasing force of the biasing mechanism.

* * * * *

UNITED STATES PATENT AND TRADEMARK OFFICE
CERTIFICATE OF CORRECTION

PATENT NO. : 6,715,575 B2
DATED : April 6, 2004
INVENTOR(S) : Gerard J. Karpik

Page 1 of 1

It is certified that error appears in the above-identified patent and that said Letters Patent is hereby corrected as shown below:

Column 15,
Line 51, insert claim 26 as follows:
--

26. A suspension system for suspending an endless track beneath a tracked vehicle chassis, the suspension system comprising:
    at least one elongated suspension rail having a front portion, a rear portion and a bottom track engaging portion;
    a front suspension arm having an upper end adapted for pivotal connection to the vehicle chassis and a lower end pivotally connected to the suspension rail;
    a rear suspension arm having an upper end for pivotal connection to the vehicle chassis and a lower end pivotally connected to the suspension rail;
    a biasing mechanism adapted to provide a biasing force to bias the suspension rail away from the vehicle chassis;
    a coupling system that couples the rear suspension arm to the suspension rail; and
    a track tensioning system coupled to the coupling system that applies a tensioning force to the endless track when the coupling system is activated, the tensioning force generating a supplemental force that augments the biasing force of the biasing mechanism.

--.

Column 16,
Line 44, replace "G-bump" with -- tail-bump --.

Signed and Sealed this

Seventeenth Day of August, 2004

JON W. DUDAS
*Acting Director of the United States Patent and Trademark Office*